US007673051B2

(12) United States Patent
Kaplan et al.

(10) Patent No.: US 7,673,051 B2
(45) Date of Patent: Mar. 2, 2010

(54) RESOURCE USAGE CONFLICT IDENTIFIER

(75) Inventors: Jesse D. Kaplan, Issaquah, WA (US);
Brandon Scott Wadsworth, Redmond, WA (US); Brian M. Grunkemeyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1253 days.

(21) Appl. No.: 11/189,284

(22) Filed: Jul. 26, 2005

(65) Prior Publication Data
US 2007/0028245 A1  Feb. 1, 2007

(51) Int. Cl.
*G06F 15/173* (2006.01)
(52) U.S. Cl. ...................... 709/226; 717/131
(58) Field of Classification Search ............ 709/226; 717/131
See application file for complete search history.

(56) References Cited
U.S. PATENT DOCUMENTS

| | | | | |
|---|---|---|---|---|
| 6,400,996 B1* | 6/2002 | Hoffberg et al. | | 700/83 |
| 6,925,638 B1* | 8/2005 | Koved et al. | | 717/155 |
| 7,020,697 B1* | 3/2006 | Goodman et al. | | 709/223 |
| 7,089,542 B2* | 8/2006 | Brand et al. | | 717/143 |
| 2003/0037181 A1* | 2/2003 | Freed | | 709/328 |
| 2003/0154468 A1* | 8/2003 | Gordon et al. | | 717/143 |
| 2006/0010195 A1* | 1/2006 | Mamou et al. | | 709/203 |
| 2006/0294502 A1* | 12/2006 | Das et al. | | 717/129 |

* cited by examiner

*Primary Examiner*—Phuoc Nguyen
(74) *Attorney, Agent, or Firm*—L. Alan Collins

(57) ABSTRACT

The exposure and usage of one or more particular physical and logical resources by methods within an isolation boundary may be annotated so as to preempt resource usage conflicts. Further described are tools, contracts, and collaborative processes for at least identifying potential resource usage conflicts. More particularly, the example tools, contracts, and collaborative processes may be used to annotate at least one of exposure and consumption of one or more particular physical and logical resources by methods within an isolation boundary.

18 Claims, 5 Drawing Sheets

RESOURCE USAGE CONFLICT IDENTIFIER

BACKGROUND

Applications, programs, functions, and other assemblies of programmable and executable code that use physical and logical resources may be modularized and versioned. These separate modules may include separate entities such as methods, classes, DLLs (dynamic link libraries), frameworks, etc., that may utilize common physical and/or logical resources. Further, code associated with the aforementioned assemblies may be divided into code modules that may be independently generated and re-generated (i.e., new versions generated) by different parties and at different times, thus subject to conflict.

SUMMARY

Tools, contracts, and collaborative processes for at least identifying potential resource usage conflicts are described herein. More particularly, the example tools, contracts, and collaborative processes may be used to annotate at least one of exposure and consumption of one or more particular physical and logical resources by methods within an isolation boundary.

DESCRIPTION OF THE DRAWINGS

The present description references the following figures.

DETAILED DESCRIPTION

Tools, contracts, and collaborative processes for at least identifying potential resource usage conflicts are presently described in.

The contracts and collaborative processes for at least identifying potential resource usage conflicts, as described herein, may relate to tools, systems, and processes for annotating resource exposure and consumption relative to an isolation boundary. Further, such tools, systems, and methods may be implemented in one or more devices, or nodes, in a network environment.

"Assembly," as described herein, may refer to a unit of deployment or, more particularly, a versionable unit of deployment for code.

"Tool," as described herein, may refer to a static analysis tool that may be capable of analyzing modules corresponding to an application, program, function, or other assemblages of programmable and executable code to identify and/or preempt potential resource usage conflicts in two or more of such modules.

"Resource," as described herein, may include both physical and logical resources associated with a given computing environment. As non-limiting examples, such resources may range from files to ports to shared state; that is, any non-executable entity that may be shared by more than one executable entity.

"Isolation boundary," as described herein, may refer to a logical or physical construct that may serve as a unit of isolation. Processes are an example of an isolation boundary. Within a managed execution environment, such an isolation boundary may be referred to as an application domain, in which multiple threads of execution may be contained. Such terminology is provided as an example only. That is, the example implementations described herein are not limited to application domains or even to managed execution environments as stated above, but rather may be applied within various other isolation boundaries implementations in various execution environments. More particularly, isolation boundaries, as related to the scope of resource exposure described herein, may further pertain to machine boundaries, process boundaries, threads, and class or assembly boundaries. Even more particularly, the scope of resource exposure, may pertain to public/private exposure, assemblies, or classes. Further, resource exposure may have multiple axis or annotations including, e.g., a type of resource as well as visibility of the resource.

Isolation boundaries may enable the code to be executed therein to be loaded from a specified source; an isolation boundary may be aborted independent of other such isolation boundaries; and processing within an isolation boundary may be isolated so that a fault occurring therein does not affect other isolation boundaries within the process. More particularly, isolation boundaries may isolate the consumption of resources therein to the extent that other isolation boundaries either do not see any changes to a resource or, rather, see the resources in a serialized, atomic fashion.

Figure 1:
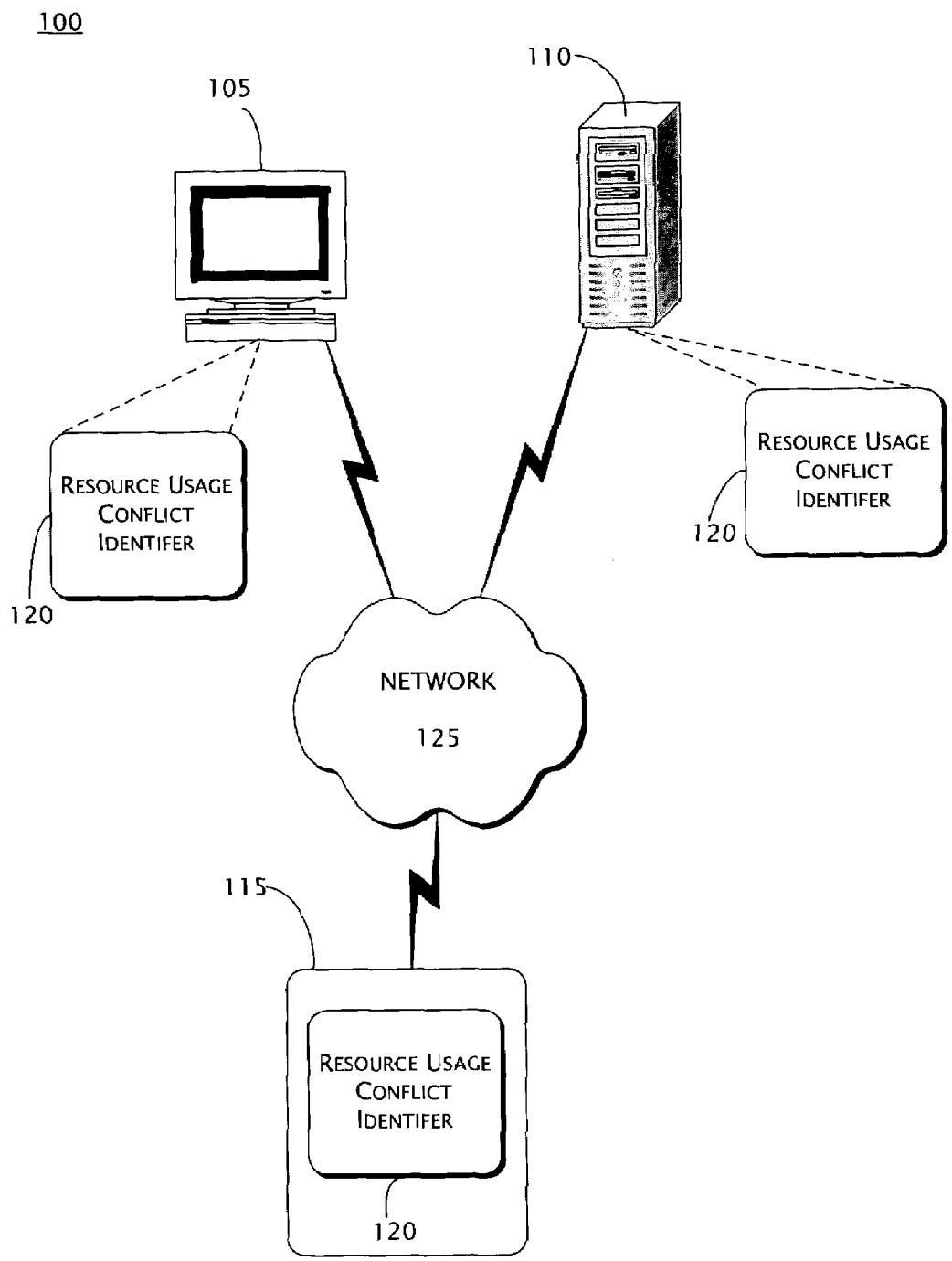
FIG. 1 shows devices communicating over a network, with the devices implementing example technologies for at least identifying potential resource usage conflicts.

FIG. 1 shows example network environment 100 in which example technologies for implementing a resource usage conflict identifier, although such example technologies are in no way limited to network environments. Such technologies may include, but are not limited to, tools, methodologies, and systems, associated with resource usage conflict identifier 120, as described herein. In FIG. 1, client device 105, server device 110, and "other" device 115 may be communicatively coupled to one another via network 125; and, further, at least one of client device 105, server device 110, and "other" device 115 may be capable of the aforementioned technologies.

Client device 105 may represent at least one of a variety of known computing devices, including a desktop personal computer (PC), workstation, mainframe computer, Internet appliance, set-top box, and gaming console. Client device 105 may further represent at least one of any device that is capable of being associated with network 125 by a wired and/or wireless link, including a mobile (i.e., cellular) telephone, personal digital assistant (PDA), laptop computer, etc. Further still, client device 105 may represent the client devices described above in various quantities and/or combinations thereof. "Other" device 115 may also be embodied by any of the above examples of client device 105.

Server device 110 may represent any device that is capable of providing any of a variety of data and/or functionality to client device 105 or "other" device 115 in accordance with at least one implementation of resource usage conflict identifier 120. The data may be publicly available or alternatively restricted, e.g., restricted to only certain users or only if an appropriate subscription or licensing fee is paid. Server device 110 may be at least one of a network server, an application server, a blade server, or any combination thereof. Typically, server device 110 may represent any device that may be a content source, and client device 105 may represent any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may represent any further device that is capable of implementing resource usage conflict identifier 120 according to one or more of the examples described herein. That is, "other" device 115 may represent any software-enabled computing or processing device that is capable of at least identifying potential resource usage conflicts associated with one or more isolation boundaries of an application, program, function, or other assemblages of programmable and executable code. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 125 may further utilize any of a variety of conventional network protocols, including public and/or proprietary protocols. Network 125 may include, for example, the Internet as well at least portions of one or more local area networks (also referred to, individually, as a "LAN"), such as 802.11 system or, on a larger scale, a wide area network (i.e., WAN"); or a personal area network (i.e., PAN), such as Bluetooth.

Computer architecture in at least one of devices 105, 110, and 115 has typically been defined computing platforms in terms of hardware and software. Software for computing devices has been categorized into groups, based on function, which may include: a hardware abstraction layer (alternatively referred to as a "HAL"), an operating system (alternatively referred to as "OS"), and applications.

A runtime execution environment may reside between an OS and an application, and serve as a space in which the application may execute specific tasks on any one or more of processing devices 105, 110, and 115. More particularly, a runtime execution environment may enhance the reliability of the execution of applications on a growing range of processing devices 105, 110, and 105, including servers, desktop computers, laptop computers, and mobile processing/communication devices by providing a layer of abstraction and services for an application running on such devices, and further providing the application with capabilities including memory management and configuration thereof.

A runtime execution environment may serve as at least one of an application programming and application execution platform. As an application programming platform, a runtime execution environment may compile targeted applications, which may be written in one of multiple computing languages, into an intermediate language (hereafter "IL") or bytecode. IL is typically independent of the platform, and the central processing unit (hereafter "CPU") executes IL. In fact, IL is a higher level language than many CPU machine languages. As an application execution platform, a runtime execution environment may interpret compiled IL into native machine instructions. A runtime execution environment may utilize either an interpreter or a compiler (e.g., "just-in-time," alternatively "JIT," compiler) to execute such instructions. Regardless, the native machine instructions may then be directly executed by the CPU. Since IL is CPU-independent, IL may execute on any CPU platform as long as the OS running on that CPU platform hosts an appropriate runtime execution environment. Examples of runtime environments, in which technologies associated with resource usage conflict identifier 120 may be implemented, include: Visual Basic runtime environment; Java® Virtual Machine runtime environment that is used to run, e.g., Java® routines; or Common Language Runtime (CLR) to compile, e.g., Microsoft .NET™ applications into machine language before executing a calling routine. However, this listing of runtime environments provides examples only. The example technologies described herein are not limited to just these managed execution environments. More particularly, the example implementations are not just limited to managed execution environments, for one or more examples may be implemented within testing environments and/or unmanaged execution environments.

An application compiled into IL may be referred to as "managed code," and that is why a runtime execution environment may be alternatively referred to as a "managed execution environment." It is noted that code that does not utilize a runtime execution environment to execute may be referred to as native code applications.

Figure 2:
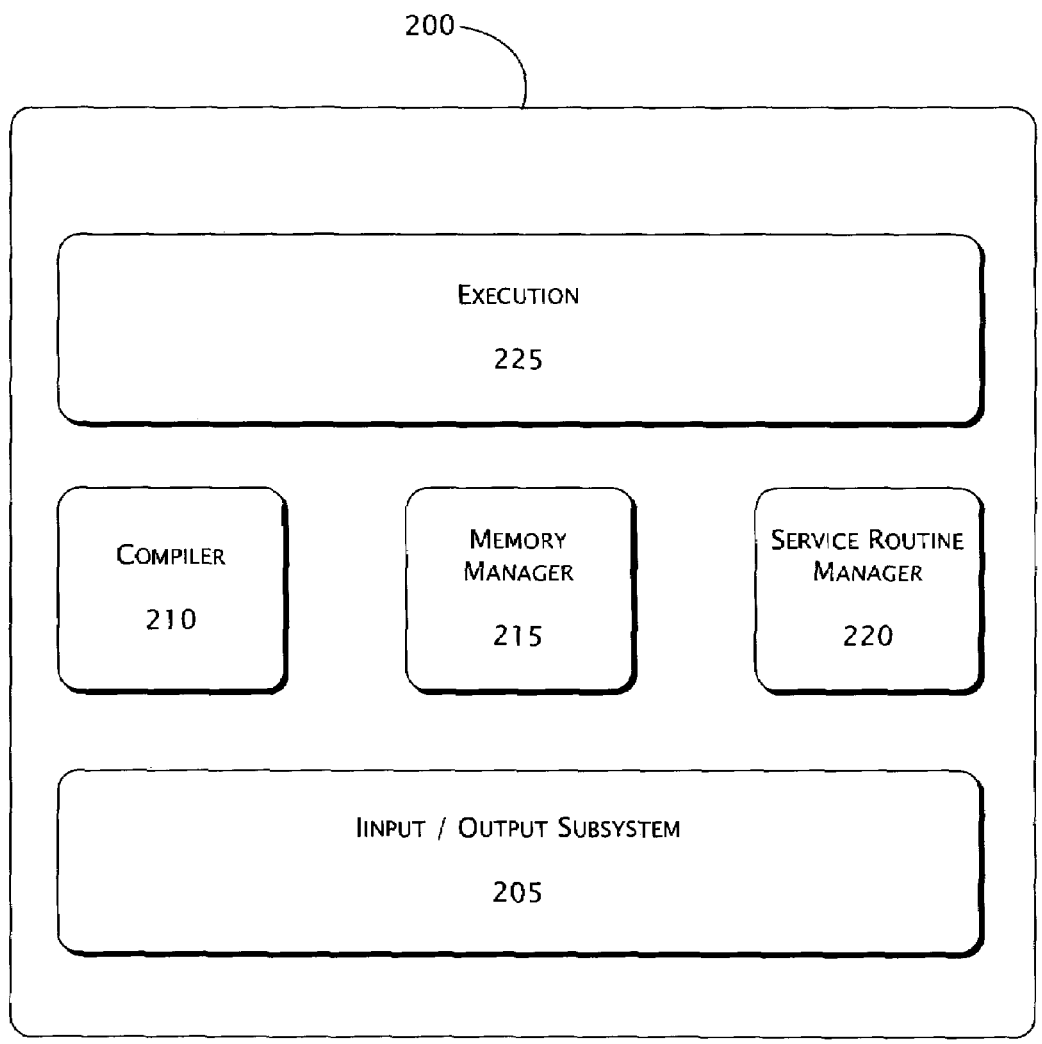
FIG. 2 shows an example of an execution environment for implementing example technologies for at least identifying potential resource usage conflicts.

FIG. 2 shows example of runtime execution environment 200 in which technologies associated with resource usage conflict identifier 120 (see FIG. 1) may be implemented.

According to at least one example implementation, runtime execution environment 200 may facilitate execution of managed code for a computing device platform. Managed code may be considered to be part of a core set of application-development technologies, and may further be regarded as an application, program, function, or other assemblages of programmable and executable code that are compiled for execution in runtime execution environment 200 to provide a corresponding service to the computing device platform. In addition, runtime execution environment 200 may translate managed code at an interpretive level into instructions that may be proxied and then executed by a processor. Alternatively, managed code may be executed via an interpreter or a compiler, or a form of a compiler designed to run at install time as a native image. A framework for runtime execution environment 200 also provides class libraries, which may be regarded as software building blocks for managed applications.

Runtime execution environment 200 may provide at least partial functionality that may otherwise be expected from a kernel, which may or may not be lacking from a computing device platform depending upon resource constraints for a particular one of devices 105, 110, and 115 (see FIG. 1). Thus, at least one example of runtime execution environment 200 may implement the following: input/output (hereafter "I/O") routine management, compiling, memory management, and service routine management. Thus, runtime execution environment 200 may include I/O component 205, compiler 210, at least one memory management component 215, service routine manager 225, and execution component 225. These components, which are to be described in further detail below, are provided as examples, which are not intended to be limiting to any particular implementation of runtime execution environment 200, and no such inference should be made. Thus, the components may be implemented in examples of runtime execution environment 200 in various combinations and configurations thereof.

I/O component 205 of runtime execution environment 200 may provide at least one of synchronous or asynchronous access to physical (e.g., processor and peripherals) and logical resources (e.g., drivers, or physical resources partitioned in a particular manner) associated with the computing device platform. More particularly, I/O component 205 may provide runtime execution environment 200 with robust system throughput and further streamline performance of code from which an I/O request originates.

Compiler 210 may refer to a module within runtime execution environment 200 that may interpret compiled IL into native machine instructions for execution in runtime execution environment 200. Further, in accordance with at least one implementation of technologies associated with resource usage conflict identifier 120, compiler 210 may dynamically analyze, for various purposes, the behavior of code modules associated with an application, program, function, or other assemblages of programmable and executable code that may be loaded into runtime execution environment 200. Such analysis may include identifying the potential for resource usage conflicts between two or more methods, how the particular physical or logical resource may be used by the two or more methods, and how the particular physical or logical resource may be exposed to callers thereof. The analysis may be performed without touching or affecting an executable portion of the code modules, and may be performed at compile time, initial runtime, or at any time thereafter during execution of an executable portion of the code modules.

Memory management component 215 may be referred to as a "garbage collector." Garbage collection may be regarded as a robust feature of managed code execution environments by which an object is automatically freed (i.e., de-allocated) if an object is no longer used by any applications, upon a sweep or scan of a memory heap. Further functions implemented by memory management component 215 may include: managing one or more contiguous blocks of finite volatile RAM (i.e., memory heap) storage or a set of contiguous blocks of memory amongst the tasks running on the computing device platform; allocating memory to at least one application running on the computing device platform; freeing at least portions of memory on request by at least one of the applications; and preventing any of the applications from intrusively accessing memory space that has been allocated to any of the other applications.

Service routine manager 220 may be included as at least a portion of an application support layer to provide services functionality for physical and logical resources associated with the computing device platform. Example technologies (e.g., tools, methodologies, and systems) associated with resource usage conflict identifier 120 may be managed by service routine manager 220. That is, such technologies may be implemented either singularly or in combination together by compiler 210 (as referenced above), service routine manager 220, or some other component of runtime execution environment 200, in accordance with various alternative implementations of such technologies. For example, in at least one example implementation, service routine manager 220 may at least contribute to the identification of potential resource usage conflicts between two or more methods, the determination of how a particular physical or logical resource may be used by the two or more methods, and the determination of how the particular physical or logical resource may be exposed to callers thereof. Such contribution may be made without touching or affecting an executable portion of the code modules, at compile time, initial runtime, or at any time thereafter during execution of an executable portion of the code modules.

Execution component 225 may enable execution of managed code for the computing device platform. More particularly, with regard to implementation of technologies associated with resource usage conflict identifier 120, execution component 225 may serve as an exemplary component within runtime execution environment 200 that may implement one or more of the tools, systems, and processes for annotating resource exposure and consumption relative to an isolation boundary.

Figure 3:
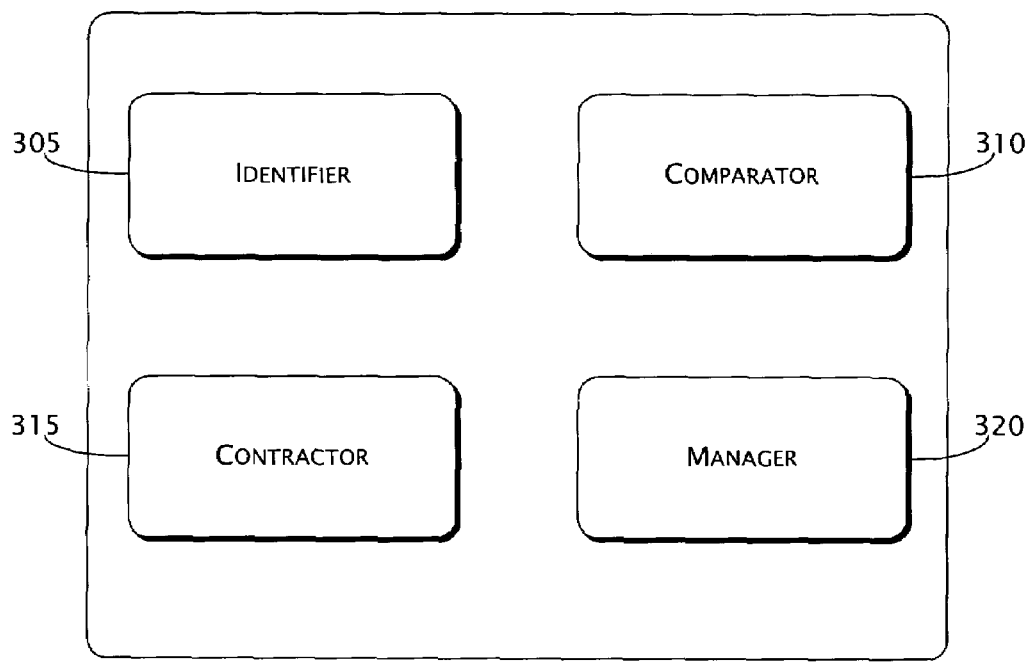
FIG. 3 shows an example of a tool for at least identifying potential resource usage conflicts.

FIG. 3 shows example static analysis tool 300 implemented as an example technology associated with resource usage conflict identifier 120 (see FIG. 1).

In the following description, various operations will be described as being performed by various modules associated with static analysis tool 300. The various operations that are described with respect to any particular one of these modules may be carried out by the module itself, in combination with another one of the modules, or by the particular module in cooperation with other components of runtime execution environment 200. In addition, the operations of each of the modules of static analysis tool 300 may be executed by a processor or processors (see FIG. 1) and implemented as hardware, firmware, or software, either singularly or in various combinations together.

Example implementations of static analysis tool 300 may be implemented in an off-line manner, separate from any of the components of runtime execution environment 200. However, at least one alternative implementation of static analysis tool 300 may incorporated with any of a portion of compiler 210, service routine manager 220, or some other component of runtime execution environment 200, either singularly or in combination together. Regardless, tool 300 may be utilized to at least identify potential resource usage conflicts between two or more methods, and further be capable of determining how the subject physical or logical resource may be used by the two or more methods and how such resource may be exposed to callers thereof. The two or more methods, and therefore the aforementioned potential resource usage conflicts, may exist among either the same or multiple versions of a same application, program, function, or other assemblage of programmable and executable code, which may or may not exist within a same isolation boundary.

Module 305 may represent an identifier to identify an initial method that is to call or expose either one of a physical or logical resource. This initial method may be referred to as an initial exposure site, since it is indicative of an initial exposure of a particular resource within a given isolation boundary.

More particularly, for any one of an application, program, function, or other assemblage of programmable and executable code that may be submitted to runtime execution environment 200, identifier 305 may identify a first method to call, access, or otherwise expose a particular physical or logical resource that is outside of a given isolation boundary (e.g., machine boundaries, process boundaries, and class or assembly boundaries). As an example, module 305 may identify one or more "P/Invoke" calls, otherwise referred to as platform invocation services, that may enable methods within a managed execution environment to call functionality found in native dynamic-linked libraries (DLLs). That is, according to at least one implementation within managed execution environment 200, module 305 may identify one or more initial call sites that request, expose, or otherwise access physical or logical resources outside of a particular isolation boundary or, alternatively, outside of the managed execution environment.

Module 305, having identified one or more initial call sites for one or more physical or logical resources, may then place a contract on the respective call sites indicating that the called functionality is known. The contract may indicate how the resource is exposed at the respective call site. Then, module 305 may further serve to identify callers of the flagged call site. Module 305 may thus continue to identify callers of methods that consume a particular physical or logical resource within the respective isolation boundary, and further may identify an additional contract on callers to identify whether they expose, to a respective caller, a resource to be consumed.

Module 310 may represent a comparator to compare resource exposure annotations in one or more methods identified by module 305 as being exposed to various physical or logical resources. More particularly, by such comparison of exposure annotations, module 310 may determine which methods may pose a potential resource usage conflict as they may call a same physical or logical resource that is external to the isolation boundary.

For example, for each identified method, module 310 may inductively check a first annotation pertaining to the resource itself. Such first annotation may relate to the scope of exposure for the physical or logical resource that is to be called by the particular method. The scope may be defined in terms of machine boundaries, process boundaries (e.g., application domains in runtime execution environment 200), and class or assembly boundaries. Module 310 may further inductively check a second annotation indicating whether the physical or logical resource that is to be called by the particular method is publicly exposed; is internal to the application, program, function, or other assemblage of programmable and executable code to which the particular method corresponds; or is private to a class to which the particular method corresponds. Module 310 may, according to different implementations thereof, perform the aforementioned inductive checks to varying depths of exposure scope to determine whether a potential resource usage conflict exists among two or more methods within a given isolation boundary.

Non-limiting examples of guidelines for the annotations used for the aforementioned inductive checks include: a method having a contract indicating that the method uses a subject resource may preferably have a contract indicating that the subject resource is exposed; a contract indicating that the method uses a subject resource may preferably specify how the resource is used; a method calling another method having a contract indicating that the called method exposes a subject resource may preferably have a contract indicating that the calling method uses the resource, and the contract indicating that the calling method uses the resource may preferably indicate a scope of exposure beyond the call site. Such guidelines are provided as example only, however, and therefore should not be inferred as being limiting in any manner.

Module 315 may represent a contractor to apply a contract or otherwise flag those methods having similar resource exposure annotations, as determined by module 310, so as to indicate a potential resource usage conflict. More particularly, module 315 may apply a contract to those methods determined to pose a potential resource usage conflict in such a manner to alert one or more appropriate third parties who may troubleshoot the methods to avoid the potential resource usage conflict. That is, static analysis tool 300 may serve to alert one or more third parties who may affect applications, programs, functions, or other assemblages of programmable and executable code of one or more potential resource conflicts; so that such third parties may take preemptive steps to avoid actualization of such conflicts. The aforementioned third parties may include developers, code authors, or even automated tools that are able to troubleshoot one or more portions of authored code including applications, programs, functions, or other assemblages of programmable and executable code.

To that end, module 315 may further apply a contract to those methods having exposure annotations, as determined by module 310, as having similar exposure annotations to indicate a potential resource usage conflict by providing the aforementioned third parties with one or more application programming interfaces (APIs) that indicate how the methods may use the physical or logical resource that is subject to the potential usage conflict as well as how such resource may be exposed to other methods. Thus, static analysis tool 300 may provide guidance to a third party as to how one or more potential resource usage conflicts may be avoided. Such guidance, in textual form or alternatively in the form of one or more APIs, may include techniques for constraining or otherwise reducing the scope of exposure or consumption of the resource among methods within a given isolation boundary. A tool may also be able to prove whether this guidance has been followed in some cases, after a third party has edited the code. Note that this further validation step may require performing data flow analysis on a method to ensure that the suggested API has been used correctly, and that the resource name has been correctly adjusted & is used as a parameter to the method exposing a resource.

Module 320 may represent a manager to receive the previously contracted methods, either separately or incorporated within respective applications, programs, functions, or other assemblages of programmable and executable code, back from the aforementioned one or more third parties. More particularly, module 320 may receive the previously contracted methods to determine whether such methods are to again be subjected to analysis by static analysis tool 300 (i.e., identifier 305, comparator 310, and contractor 315). Such re-iteration may be appropriate until identifier 305 is no longer able to identify any new methods exposing a physical or logical resource into a given isolation boundary, or until comparator 310 is no longer able to identify two or more methods having exposure and consumption contracts indicative of the methods potentially causing a resource usage conflict within the given isolation boundary. That is, re-iterations end when module 320 detects a method having an exposure annotation indicating that the scope of further exposure is "none" or when no unmarked methods remain that call other methods exposing resources.

Figure 4:
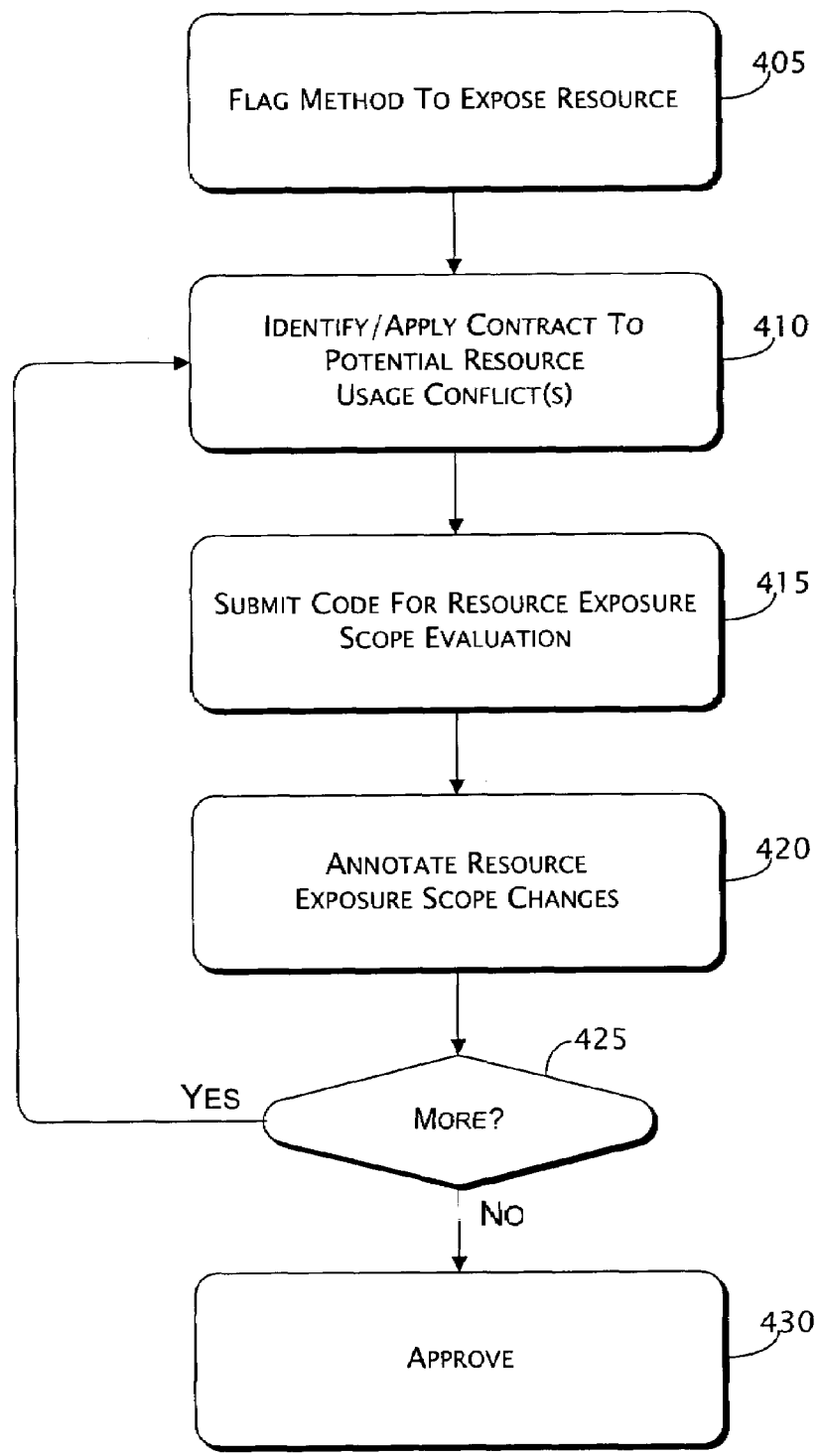
FIG. 4 shows an example processing flow for a tool to at least identify potential resource usage conflicts.

FIG. 4 shows example processing flow 400 implemented as an example technology associated with resource usage conflict identifier 120 (see FIG. 1). Processing flow 400 may be described with reference to the features and characteristics described above with regard to runtime execution environment 200 in FIG. 2 and example static analysis tool 300 in FIG. 3. However, such implementations are provided as examples only, and are not intended to be limiting in any manner.

Block 405 may refer to identifier 305 flagging or otherwise identifying an initial method having an exposure contract that is, an initial call site to either one of a physical or logical resource.

According to at least one example implementation, the flagging at block 405 may occur upon identifying one or more "P/Invoke" calls that may enable methods within a managed execution environment to call functionality found in native dynamic-linked libraries (DLLs). Thus, according to at least one implementation, one or more initial call sites that request, expose, or otherwise consume physical or logical resources outside of a particular isolation boundary or, alternatively, outside of the managed execution environment, may be flagged at block 405.

Block 410 may refer to comparator 310 comparing resource exposure annotations in one or more methods flagged at block 405 to determine which methods may pose a resource usage conflict as they may call a same physical or logical resource that is external to the isolation boundary. The comparison may include inductively checking the flagged methods for a first annotation pertaining to the resource itself. Such first annotation may relate to the scope of exposure for the physical or logical resource that is to be called by the particular method. The comparison may further include inductively checking a second annotation indicating whether the physical or logical resource that is to be called by the particular method is publicly exposed; is internal to the application, program, function, or other assemblage of programmable and executable code to which the particular method corresponds; or is private to a class to which the particular method corresponds.

Block 410 may further include contractor 315 applying a contract to those flagged methods determined to have similar resource exposure annotations, which may be indicative of a potential resource usage conflict.

Block 415 may refer to manager 320 submitting the contracted methods determined to pose a potential resource usage conflict to one or more appropriate third parties who may troubleshoot or otherwise affect the methods to avoid the potential resource usage conflict. As stated previously, the one or more third parties may include developers, code authors, or even automated tools that are able to troubleshoot one or more portions of authored code including applications, programs, functions, or other assemblages of programmable and executable code. The troubleshooting implemented by such appropriate third parties is described in further detail below in accordance with FIG. 5.

In submitting the contracted methods to the appropriate one or more third parties, manager 320 may provide the aforementioned third parties with one or more APIs that indicate how the contracted methods may use the physical or logical resource that is subject to the potential usage conflict as well as how such resource may be exposed to other methods. The APIs may effectively guide an appropriate third party in troubleshooting or otherwise re-coding the contracted methods to preempt an identified potential resource usage conflict. The guidance may include processes for constraining or otherwise reducing the scope of exposure of the resource among methods within a given isolation boundary.

Block 420 may refer to manager 320 receiving the previously contracted methods back from the aforementioned one or more third parties. The previously contracted methods may be received either separately or incorporated within respective applications, programs, functions, or other assemblages of programmable and executable code. More particularly, module 320 may annotate resource exposure scope changes that may have been made to the previously contracted methods by the appropriate third party.

Decision 425 may refer to manager 320 determining whether the previously contracted methods received back from the appropriate one or more third parties are to again be subjected to analysis by static analysis tool 300.

Positive decision 425 directs processing flow 400 back to block 410. That is, if manager 320 is able to determine that two or more of the previously contracted methods expose a same physical or logical resource into a given isolation boundary, or if comparator 310 is still able to identify two or more of the previously contracted methods as having exposure and consumption contracts to indicate a potential resource usage, further iterations of portions of processing flow 400 (ie., at least blocks 410, 415, and 420) may be appropriate to preempt resource usage conflicts.

Block 430 may refer to manager 320 determining that the previously contracted methods returned from the appropriate one or more third parties have associated therewith an exposure annotation indicating that the scope of further exposure is "none", or no callers exist for remaining methods that expose resources. Thus, the applications, programs, functions, or other assemblages of programmable and executable code to which the aforementioned methods are associated, may be approved for further processing.

Figure 5:
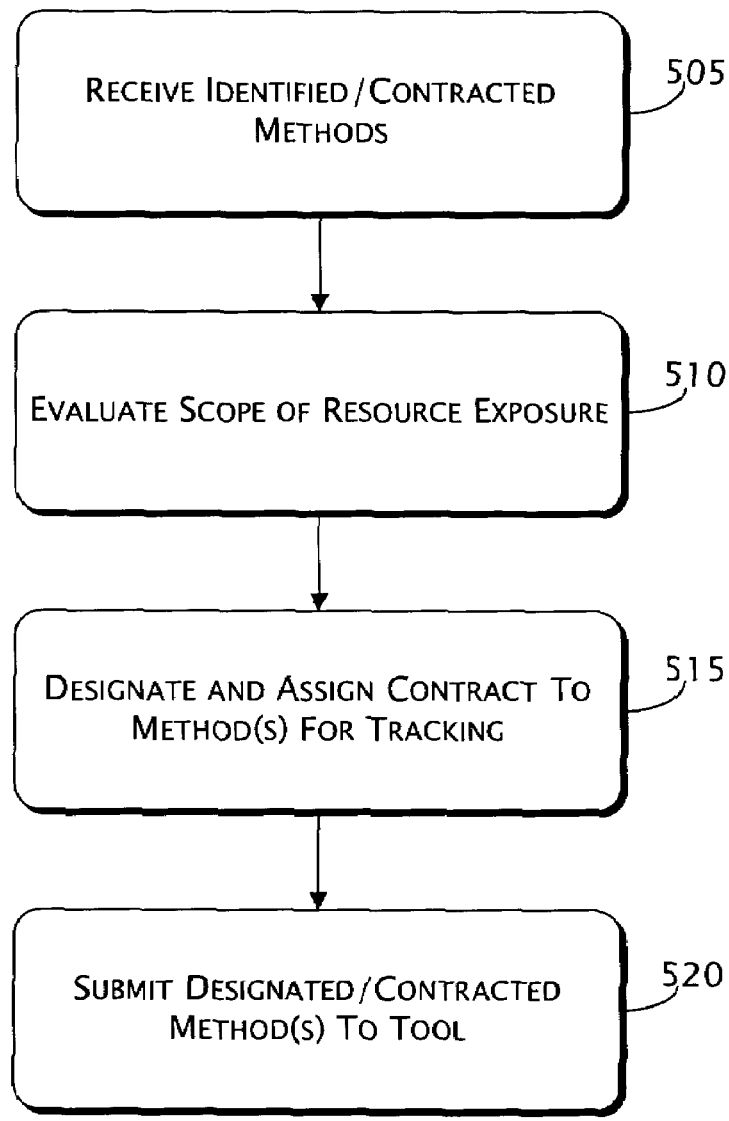
FIG. 5 shows an example processing flow for a third party to interact with the example tool of FIG. 4.

FIG. 5 shows example processing flow 500 implemented in accordance with an example technology associated with resource usage conflict identifier 120 (see FIG. 1). More particularly, further to processing flow 400, processing flow 500 may be implemented by any one of the aforementioned appropriate third parties to interact with the example tool of FIG. 3. Such third parties may include developers, code authors, or even automated tools that are able to troubleshoot one or more portions of authored code including applications, programs, functions, or other assemblages of programmable and executable code.

Processing flow 500 may be described with reference to the features and characteristics described above with regard to runtime execution environment 200 in FIG. 2, example tool 300 in FIG. 3, and processing flow 400 in FIG. 4. More particularly, processing flow 500 may be implemented in block 415 of processing flow 400, as code is submitted to one or more appropriate third parties for resource exposure scope evaluation.

Block 505 may refer to at least one of the appropriate third parties receiving, from static analysis tool 300, the contracted methods determined to pose a potential resource usage conflict.

Block 510 may refer to the one or more appropriate third parties evaluating the scope of resource exposure by the previously contracted methods received at block 505. As part of such evaluation, the one or more appropriate third parties may verify whether the methods received at block 505 pose a potential resource usage conflict within a given isolation boundary.

Further, at block 510, the one or more appropriate third parties may act to narrow the scope of resource consumption or exposure by one or more of the previously contracted methods received at block 505 in accordance with a variable set of correctness rules that may be received as guidance associated with the aforementioned methods. The scope of the methods may be narrowed or otherwise constrained by modifying, e.g., a file name associated therewith so as to reduce and/or eliminate a possibility of a resource conflict. Additionally, after marking one or more of the methods with a reduced resource exposure, this may reduce the number of further methods to which the modified method may be exposed. Accordingly, the amount of potential work for future iterations may be reduced significantly.

Examples of the correctness rules that may be received as APIs associated with the previously contracted methods, and by which the one or more appropriate third parties may modify the previously contracted methods, include, but are not limited to: making no change to a method that is to call a machine resource and exposes the method to callers; when a method is to call a machine resource that is to be used as a process-scoped resource, the scope of exposure of the resource may be narrowed or otherwise constrained by modifying the name of the resource using the process identification; when a method is to call a process resource that is to be used as an application domain resource in a managed execution environment, the scope of exposure of the resource may be narrowed or otherwise constrained by modifying the name of the resource using the application domain identification; when a method is to call a machine resource that is to be used as an application domain resource in a managed execution environment, the scope of exposure of the resource may be narrowed or otherwise constrained by modifying the name of the resource using both the process identification and the application domain identification; when a method is to call a public resource that is to be used as an assembly resource, the scope of exposure of the resource may be narrowed or otherwise constrained by modifying the name of the resource using the name of the assembly; when a method is to call an assembly that is to be used as a private resource, the scope of exposure of the resource may be narrowed or otherwise constrained by modifying the name of the resource using the name of the type (or method) using the resource; and when a method is to call a public resource that is to be used as a private resource, the scope of exposure of the resource may be narrowed or otherwise constrained by modifying the name of the resource using the assembly name and the name of the type (or method) using the resource.

To use a resource called by one of the previously contracted methods without further exposing the resource, the one or more appropriate third parties may isolate calling code associated with the method from state associated with the resource. That is, data passed in from a caller may not be stored in the state associated with the resource, and data stored in the resource may not leak back to the caller directly.

Block 515 may refer to the one or more appropriate third parties designating and applying a contract to one or more of the methods received at block 505 for further annotating. That is, based on the evaluated scope of resource exposure of the methods, which may have been narrowed or otherwise constrained at block 510, the one or more appropriate third parties may apply a contract to the methods requiring further analysis by static analysis tool 300, to determine whether the methods may still pose potential resource usage conflicts.

Block 520 may refer to the one or more appropriate third parties re-submitting at least the further contracted methods back to static analysis tool 300, to determine whether the further potential resource usage conflicts do exist. That is, the methods may be re-submitted to processing flow 400 at block 420.

By the description above, pertaining to FIGS. 1-5, resource usage conflicts may be identified and pre-empted in at least a managed execution environment. However, the example implementations described herein are not limited to just the environment of FIG. 1, the components of FIGS. 2 and 3, or the processes of FIGS. 4 and 5. Technologies (e.g., tools, methodologies, and systems) associated with resource usage conflict identifier 120 (see FIG. 1) may be implemented by various combinations of the components described with reference to FIGS. 2 and 3, as well as in various orders of the blocks described with reference to FIGS. 4 and 5.

Further, the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electric erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that code module initialization may be implemented without one or more of the specific details, or with other methods, resources, materials, etc. In other instances, well known structures, resources, or operations have not been shown or described in detail merely to avoid obscuring aspects of the invention.

While example implementations and applications of the code module initialization have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A process, comprising:

receiving an identity of methods that expose a resource outside of a given isolation boundary that is an application domain within a managed execution environment;

evaluating a scope of resource consumption and exposure by the identified methods in the isolation boundary;

applying a contract to the identified methods for annotating; and submitting the contracted methods for annotating based on the evaluated scope of resource method, the process being performed by a computing device.

2. A process according to claim 1, wherein the receiving includes receiving the identity of the method from an analysis tool.

3. A process according to claim 1, wherein the evaluating includes verifying that the identified methods are to expose the resource to other identified methods within the isolation boundary.

4. A process according to claim 1, wherein the evaluating includes narrowing the scope of the resource exposure by the identified methods within the isolation boundary.

5. A process according to claim 1, wherein the applying a contract includes applying the identified methods with a contract to indicate the evaluated scope of resource exposure and consumption.

6. A process according to claim 1, wherein the submitting includes submitting the methods to a static analysis tool.

7. A process according to claim 1, wherein the process is repeated until no further unmarked methods that expose the resource are identified.

8. At least one computer-readable medium having executable instructions that, when read, cause one or more processors to:

identify a first call site to expose a resource that is outside an isolation boundary that is an application domain within a managed execution environment;

identify at least two methods that call a method that exposes a resource;

apply a contract to the at least two methods with a corresponding scope of consumption and scope of exposure; and annotate changes of a scope of consumption and exposure for the resource relative to the isolation boundary.

9. At least one computer-readable medium according to claim 8, wherein the first call site implements an unmanaged method call.

10. At least one computer-readable medium according to claim 8, wherein the resource is shared state.

11. At least one computer-readable medium according to claim 8, wherein the potential resource usage conflicts pertain to at least one of a physical resource or a logical resource.

12. At least one computer-readable medium according to claim 8, wherein the one or more instructions to identify the potential resource usage conflicts cause the one or more processors to compare resource exposure and consumption contracts in the at least two methods.

13. At least one computer-readable medium according to claim 8, wherein the one or more instructions to apply a contract to the at least one method cause the one or more processors to attach at least one process pertaining to usage of the resource and at least one process pertaining to narrowing a scope of the method within the isolation boundary.

14. At least one computer-readable medium according to claim 8, wherein the one or more instructions to apply a contract to the at least one method within the isolation boundary further cause the one or more processors to avail the at least one method to a contributing developer of the at least one method.

15. A system, comprising:
a processor;

an identifier operable to identify at least one method to expose a resource related to a given isolation boundary that is an application domain within a managed execution environment;

a comparator operable to compare the identified methods operable to use the resource with regard to consumption of the resource;

a contractor operable to apply a contract to those of the compared methods that may conflict when attempting to use the resource; and a manager operable to gauge whether the contracted methods are to be re-submitted to the system wherein operations of the identifier, the comparator, the contractor, and the manager are performed by the processor.

16. A system according to claim 15, wherein the identifier is to identify methods that access shared state.

17. A system according to claim 15, wherein the contractor is to apply a contract by appending an explanation of resource consumption to one of the methods and an explanation of how the resource is be exposed to further methods.

18. A system according to claim 15, wherein the manager is to receive those of the contracted methods having had a scope thereof reduced from an external source that may avoid a resource conflict and/or reduce exposure of the resource to one or methods in a particular isolation boundary.

* * * * *